US012748967B2

(12) United States Patent
Vandikas et al.

(10) Patent No.: US 12,748,967 B2
(45) Date of Patent: Sep. 29, 2026

(54) METHODS AND APPARATUSES FOR TRAINING A NEURAL NETWORK

(71) Applicant: Telefonaktiebolaget LM Ericsson (publ), Stockholm (SE)

(72) Inventors: Konstantinos Vandikas, Solna (SE); Aneta Vulgarakis Feljan, Stockholm (SE); Anusha Pradeep Mujumdar, Bangalore (IN); Cecilia Nyström, Stockholm (SE); Kristijonas Cyras, San Jose, CA (US); Ramamurthy Badrinath, Bangalore Karnataka (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 713 days.

(21) Appl. No.: 18/029,693

(22) PCT Filed: Aug. 6, 2021

(86) PCT No.: PCT/EP2021/072086
§ 371 (c)(1),
(2) Date: Mar. 31, 2023

(87) PCT Pub. No.: WO2022/069100
PCT Pub. Date: Apr. 7, 2022

(65) Prior Publication Data

US 2023/0334311 A1 Oct. 19, 2023

(30) Foreign Application Priority Data

Oct. 3, 2020 (IN) ............................. 202041043041

(51) Int. Cl.
*G06N 3/08* (2023.01)
*G06N 3/0455* (2023.01)
*G06N 3/0495* (2023.01)

(52) U.S. Cl.
CPC ............. *G06N 3/08* (2013.01); *G06N 3/0455* (2023.01); *G06N 3/0495* (2023.01)

(58) Field of Classification Search
CPC ........ G06N 3/045; G06N 3/0464; G06N 3/08; G06N 3/09; G06N 3/082; G06N 3/084;
(Continued)

(56) References Cited

U.S. PATENT DOCUMENTS

| | | | | |
|---|---|---|---|---|
| 10,621,486 | B2 | 4/2020 | Yao | |
| 2020/0364545 | A1* | 11/2020 | Shattil | G06N 3/048 |
| 2021/0303972 | A1* | 9/2021 | Lee | G06N 3/0464 |

OTHER PUBLICATIONS

Chmiel, Brian, et al., "Feature Map Transform Coding for Energy-Efficient CNN Inference", arXiv:1905.10830v3 [cs.CV], 2019, 1-20.
Choi, Jungwook, et al., "PACT: Parameterized Clipping Activation for Quantized Neural Networks", arxiv.org, Cornell University Library, 2018, 1-15.

(Continued)

*Primary Examiner* — Shyue Jiunn Hwa
(74) *Attorney, Agent, or Firm* — Murphy, Bilak & Homiller, PLLC

(57) ABSTRACT

Embodiments described herein relate to methods and apparatuses for training a neural network. A method comprises receiving an input data set at a layer of the neural network; performing a forward pass and a backward pass on the input data set to determine regular output data; calculating a first loss associated with the regular output data; performing a quantized forward pass and a quantized backward pass on the input data set to determine quantized output data; calculating a second loss associated with the quantized output data; comparing the first loss to the second loss; and based on the comparison determining whether to reduce the input data set to provide a reduced data set.

17 Claims, 7 Drawing Sheets

(58) Field of Classification Search
CPC .......... G06N 3/04; G06N 3/063; G06N 3/044; G06N 3/088; G06N 3/047; G06N 20/00; G06N 20/10; G06N 7/01; G06N 3/048; G06N 3/091; G06N 3/094; G06N 5/01; G06N 3/086; G06N 3/092; G06N 3/10; G06N 5/04; G06N 3/0442; G06N 3/0495; G06N 3/0455; G06N 3/0499; G06N 3/0895; G06N 3/096; G06N 3/0985; G06F 18/211; G06F 18/214; G06F 18/22; G06F 18/2413; G06F 18/2415; G06F 18/2431; G06F 18/2433
See application file for complete search history.

(56) References Cited

OTHER PUBLICATIONS

Nine, Md S Q Zulkar, et al., "GreenDataFlow: Minimizing the Energy Footprint of Global Data Movement", arXiv:1810.05892v1 [cs.NI], 2018, 1-13.
Pandey, Padmakar, et al., "Efficient Neural Network Based Principal Component Analysis Algorithm", 2018 Conference on Information and Communication Technology (CICT'18), 2018, 1-5.
Rath, Shakti P., et al., "Improved feature processing for Deep Neural Networks", Interspeech 2013, Lyon, France, Aug. 25-29, 2013, 109-113.
Zhu, Xiaotian, et al., "Adaptive Layerwise Quantization for Deep Neural Network Compression", IEEE International Conference on Multimedia and Expo (ICME), 2018, 1-6.

* cited by examiner

METHODS AND APPARATUSES FOR TRAINING A NEURAL NETWORK

TECHNICAL FIELD

Embodiments described herein relate to methods and apparatuses for training a neural network. In particular, the methods and apparatuses described provide improvements in the amount of data required by a neural network, and the energy expended in both the training and use of the neural network.

BACKGROUND

In the state of the art, neural networks are trained by moving batches of data from a computer's non-volatile memory (i.e. an solid-state drive (SSD)) to a Central Processing Unit's (CPU's) Random Access Memory (RAM) or to a Graphical Processing Unit's (GPU's) memory. Once each batch of data is processed, the process resumes with the next and so on. If enough memory is available, all batches are loaded in advance, thus speeding up this process.

Known approaches to decentralized training of neural networks (such as DistBelief or Tensorflow) focus on propagation of parameters among different nodes in synchronous or asynchronous form. Such approaches however do not consider the producers of the input data used in each set of neurons.

The main limitation with this approach of training neural networks by moving batches of data is that it may take a lot of time until all the information is transferred, and it might be the case that the batch of data that has been transferred (in most cases over a computer network) does not have an impact on the target variable, or only certain features of the input data may have an impact. Alternatively, a modified version of the features of the input data may have the same impact but with a lower network footprint (e.g. less energy is consumed by the network).

Multiple studies have shown that data movement has a significant energy footprint, at terawatt levels at web scale. Although in decentralized machine learning (ML) the scale is currently lower, it is nonetheless important to minimize data movement. The cost of data movement will mainly have impact during training, but also later, in the use of the trained neural network.

SUMMARY

According to some embodiments there is provided a method of training a neural network. The method comprises receiving an input data set at a layer of the neural network; performing a forward pass and a backward pass on the input data set to determine regular output data; calculating a first loss associated with the regular output data; performing a quantized forward pass and a quantized backward pass on the input data set to determine quantized output data; calculating a second loss associated with the quantized output data; comparing the first loss to the second loss; and based on the comparison determining whether to reduce the input data set to provide a reduced data set.

According to some embodiments there is provided a method of using a neural network trained according to the method described above.

According to some embodiments there is provided a system comprising a neural network where the neural network is trained by the method described above.

According to some embodiments there is provided a network node for implementing training of a neural network. The network node comprises processing circuitry configured to: receive an input data set at a layer of the neural network; perform a forward pass and a backward pass on the input data set to determine regular output data; calculate a first loss associated with the regular output data; perform a quantized forward pass and a quantized backward pass on the input data set to determine quantized output data; calculate a second loss associated with the quantized output data; compare the first loss to the second loss; and based on the comparison, determine whether to reduce the input data set to provide a reduced data set.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Figure 1:
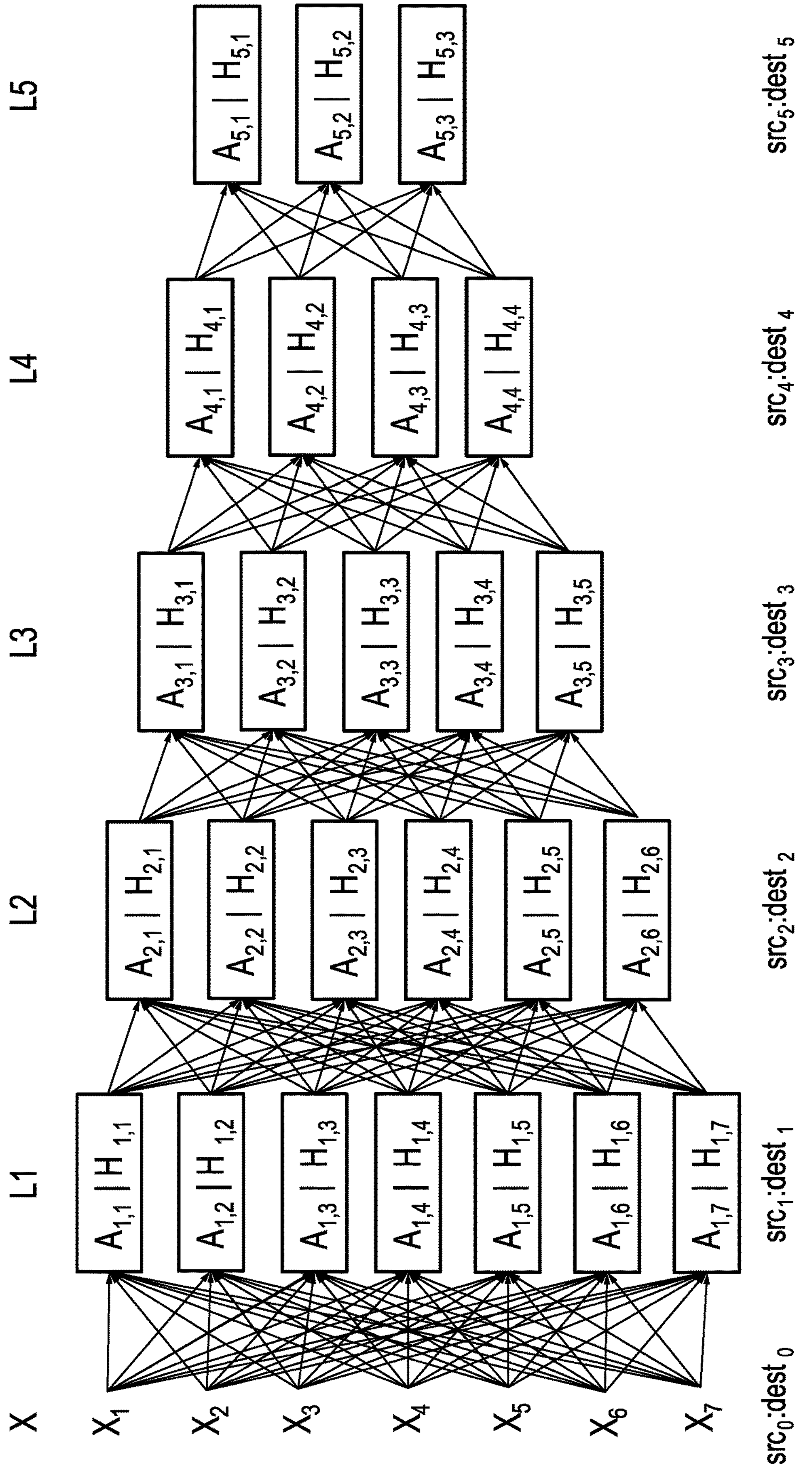
FIG. 1 illustrates a neural graph of an example neural network.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein propose determining a reduced data set for input into a layer of neural network. In some examples, network-aware neural network training is provided where one or more layers of a neural network can optionally maintain physical information for the source of the input data set at that layer (e.g. address information such as a MAC address or IP address). The reduced data set may comprise a transformed version of an original data set for input into the layer of the neural network. In some examples, the reduced data set may comprise less features than the original data set. For example, if the original data set comprised a vector of length X, the reduced data set may comprise a vector with a length less than X.

The skilled person will be familiar with neural networks, but in brief, neural networks are a type of supervised/unsupervised machine learning model that can be trained to predict a corresponding output for given input data. Neural networks are trained by providing training data comprising example input data and the corresponding "correct" or ground truth outcome that is desired. Neural networks comprise a plurality of neurons (or layers), each neuron representing a mathematical operation that is applied to the input data. The neurons are arranged in a sequential structure such as a layered structure, whereby the output of neurons in each layer in the neural network is fed into the next layer in the sequence to produce an output. The neurons are associated with weights and biases which describe how and when each neuron "fires". During training, the weights and biases associated with the neurons are adjusted (e.g. using techniques such as backpropagation and gradient descent) until the optimal weightings are found that produce predictions for the training examples that best reflect the corresponding ground truths. The skilled person will be familiar with methods of training a neural network using training data (e.g. gradient descent etc.) and will appreciate that the training data may comprise many hundreds or thousands of rows of training data.

In initial stages of the training phase, embodiments described herein may operate as usual, for example, each layer may gather an input data set from a known data source (e.g. from input training data, or from a previous layer in the neural network) and may perform forward/backward pass of the input data set. Each layer may also perform a quantized version of the forward and backward pass of the input data set.

The quantized version of the forward and backward pass may involve providing a quantized version of each parameter in each layer of neural network when applying the forward and backward pass. For example, 32 bit versions may be taken of each parameter in each layer (instead of, for example 64 bit original versions).

Loss functions may then be used to determine the loss based on both the regular iteration and the quantized iteration. If the losses are similar, then it may be determined that the input data set may be reduced, as the similar losses indicate that certain features of the input data set are having minimal, if any, effect on the output data set.

For example, if a certain feature of the input data set is not needed since it yields no activation of subsequent neurons, that feature may not be included in the reduced data set, in other words the data source will cease to send the data corresponding to that feature in any further training steps or in the actual implementation of the trained neural network.

By providing a reduced data set for input into a layer, the proposed embodiments reduce the network footprint of the training and inference process by reducing the amount of data to be transferred and processed without (significantly) sacrificing the quality of the trained neural network.

For example, in telecommunications time series prediction problems are prevalent, most often modeled as LSTM models which are a type of recurrent neural network.

One example of a time series prediction model is future prediction of Key Performance Indicators (KPI). For example, it may be desirable to predict what a certain KPI (e.g. latency/throughput/energy consumption of a site) is going to look like in the future (e.g. the next hour, next day etc). The problem can be modelled either as a classification or as a regression. The case of classification may be more interesting when the magnitude of a value cannot be predicted (for example, the amount of throughput in the next hour cannot be determined) but whether it will increase, stay the same or deteriorate can be predicted—consequently giving three classes which may be dealt with by using a soft max function in the final layer of the neural network. In the case of regression, the magnitude is predicted, and the final layer of the neural network may be simpler, typically accompanied by an activation function.

When developing such models relating to KPI prediction, a lot of input data may be required, for example, in the case of KPI prediction for throughput, about 1 GB of data may be required during training to enable predictions for next week to work. By utilising embodiments described herein, the volume of data that needs to be transferred may be reduced, at the very least between the data source and the first layer of the neural network.

Another example of an application for embodiments described herein may be network traffic classification. The aim in network traffic classification may be to identify the type of traffic in a network without requiring deep packet inspection. Instead historical data relating to the amount of SACK packets, URG packets, FIN packets, packet losses, payload size and round trip time statistics may be utilized to determine whether the traffic is classified as VWWV, FTP, MAIL, P2P, GAMES. The input data needed for such a problem may be substantial—typically in the order of GBs. Particularly the input training data for the neural network may be as large as 248 input parameters. Consequently, the embodiments described herein may be utilised to produce a reduction in the amount of data shared between layers and consequently over the network if different layers are stored in different physical nodes.

FIG. 1 illustrates a neural graph 100 of an example neural network.

In the neural graph 100 a vector X illustrates features that are used as input training data for the example neural network. In this example, therefore, the features $x_1$ to $x_7$ are the input data set. The input vector X may be stored in a physical network node, node 0. The input vector X may describe features relating to KPIs. For example, input vector X may comprise the value of a KPI at past points in time. Alternatively, the input vector X may comprise historical data relating to the amount of SACK packets, URG packets, FIN packets, packet losses, payload size and round-trip time statistics.

The example neural network 100 has 5 layers $L_1$ to $L_5$ (or neurons). In this example, each layer is stored in a different network node, although it will be appreciated that one or more layers of the neural network may be collocated in a network node.

Every edge in the neural network 100 carries a weight (e.g. $W_{1,1}$) and every vertice performs a preactivation (e.g. $A_{1,1}$ a weighted sum of the inputs at the vertice) and activation (e.g. $H_{1,1}$ a nonlinear function performed on the output of the preactivation such as sigmoid, Relu, LeakyRelu etc.). Weights and preactivation functions may be stored in the corresponding network node (e.g. $W_{1,1}$ is stored in Node 1). The network node comprising each layer may also perform the computation for preactivation and activation which take place during a forward pass (also known as forward propagation).

In some embodiments, the input data set for each layer, for example, the input vector X for $L_1$, or the neural network parameters received from layer $L_1$ for layer $L_2$ may comprise an indication of the address of the source of the input data set. For example, the input vector X may comprise an indication of the source address, e.g. $src_0$, and the neural network parameters output by layer $L_1$ to layer $L_2$ may comprise an indication of the source address, e.g. $src_1$.

The same conditions may apply for a backward propagation of the neural network 100, which is the process of fine-tuning the weights stored in each layer in order to decrease the loss (actual vs. predicted value). A new weight may be equal to the old weight minus the derivative of the input multiplied by the learning rate.

Figure 2:
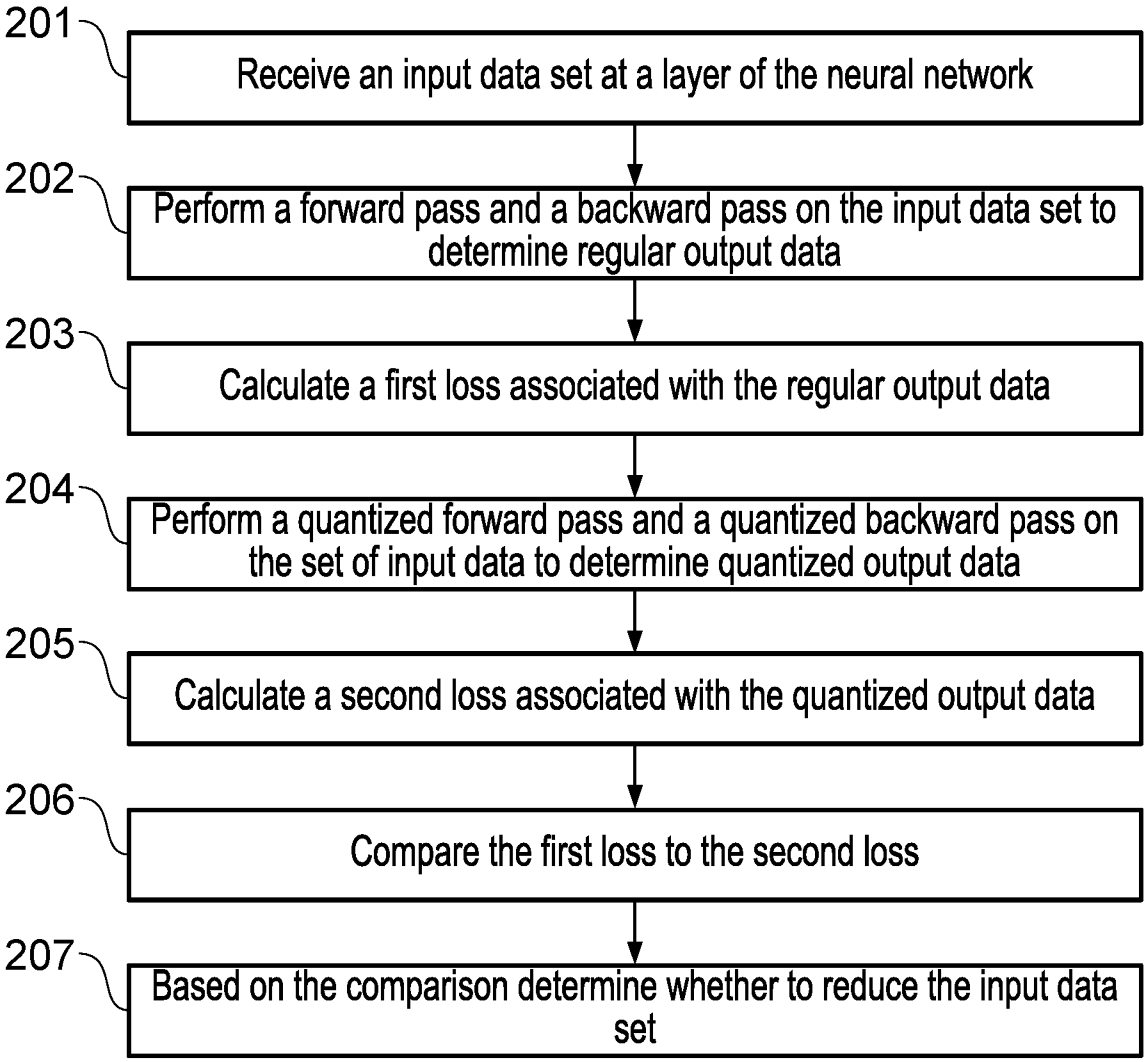
FIG. 2 illustrates a method of training a neural network according to some embodiments.

FIG. 2 illustrates a method of training a neural network according to some embodiments. The method may, in some examples, be performed by any layer in a neural network. It will be appreciated that the method as described with reference to FIG. 2 may be performed by one, some or all of the layers in a neural network.

In step 201, the method comprises receiving an input data set at a layer of the neural network. For example, for the layer $L_1$ in FIG. 1, the input data set comprises the input vector of features $x_1$ to $x_7$, whereas, the input data set for the layer $L_2$ comprises the neural network parameters output by the previous layer in the neural network 100, in this example layer $L_1$.

Where the input data set comprises training data for the neural network, the input data set may comprise features relating to KPIs. For example the input data set may comprise the value of a KPI at past points in time. Alternatively, the input data set may comprise historical data relating to the amount of SACK packets, URG packets, FIN packets, packet losses, payload size and round-trip time statistics.

In step 202, the method comprises performing a forward pass and a backward pass on the input data set to determine regular output data. In other words, the neural network passes the input data set, and provides regular output data from the final layer in the network. In the example neural graph of FIG. 1, the regular output data may be output by the layer $L_5$. For example, the input data set may comprise training data provided as input to the neural network, or may comprise neural network parameters received from a previous layer in the neural network.

In examples in which the input data set comprise features relating KPIs, for example, input data set may comprise the value of a KPI at past points in time, the regular output data may comprise data indicative of a future predication of the KPI at one or more future points in time.

In examples in which the input data set comprises historical data relating to the amount of SACK packets, URG packets, FIN packets, packet losses, payload size and round trip time statistics, the regular output data may comprise an indication of the classification of the traffic type, for example, whether the traffic is classified as WWW, FTP, MAIL, P2P, GAMES.

In step 203, the method comprises calculating a first loss associated with the regular output data. For example, a loss function such as mean square error may be calculated for the regular output data.

The loss function may compare the regular output data to ground truth data. For example, the future predication of the KPI at one or more future points in time (regular output data) may be compared to what was known to be the value of the KPI at the futures point in time (ground truth data).

Similarly, the indication of the classification of the traffic type may be compared to what was known to be the traffic data type associated with the input data set.

In step 204, the method comprises performing a quantized forward pass and a quantized backward pass on the input data set to determine quantized output data. For example, the input data set may be quantized, for example, 8 or 16 bit versions of the values for each feature in the input data set may be taken, and these 8 bit versions may be passed through the neural network to provide the quantized output data.

As with step 202, in examples in which the input data set comprise features relating to KPIs, for example, input data set may comprise the value of a KPI at past points in time, the quantized output data may comprise data indicative of a future predication of the KPI at one or more future points in time.

In examples in which the input data set comprises historical data relating to the amount of SACK packets, URG packets, FIN packets, packet losses, payload size and round trip time statistics, the quantized output data may comprise an indication of the classification of the traffic type, for example, whether the traffic is classified as WWW, FTP, MAIL, P2P, GAMES.

In step 205, the method comprises calculating a second loss associated with the quantized output data. For example, the loss function (e.g. mean square error) may be calculated for the quantized output data to determine the value of the second loss.

Similarly to step 203, the loss function may compare the quantized output data to ground truth data. For example, the future predication of the KPI at one or more future points in time (quantized output data) may be compared to what was known to be the value of the KPI at the futures point in time (ground truth data).

Similarly, the indication of the classification of the traffic type may be compared to what was known to be the traffic data type associated with the input data set.

In step 206, the method comprises comparing the first loss to the second loss. For example, a magnitude of the difference between the first loss and the second loss may be calculated.

In step 207, the method comprises determining whether to reduce the input data set to provide a reduced data set based on the comparison of the first loss to the second loss. For example, the method may comprise determining to reduce the input data set responsive to the magnitude of a difference between the first loss and the second loss being below a threshold value, or being zero.

The method as claimed in any preceding claim wherein the input data set comprises an indication of an address of a source of the input data set. For example, the address may comprise one of: an Internet Protocol address, a MAC address and a virtual LAN address.

In some example, responsive to determining to reduce the input data set, the layer in the neural network may transmit a request to the address of the source to reduce the input data set.

In some examples, the source of the input data set may initiate performance of a transformation of the input data set to provide the reduced data set. In some examples, the transformation comprises determining principle components of the input data set and setting the principle components of the input data set as the reduced data set. For example, the transformation may comprise performing principle component analysis, PCA, on the input data set. The PCA may provide a reduced number of features in the reduced data set when compared to the input data set.

In some examples, the transformation may comprise utilizing an autoencoder to determine the reduced data set. The autoencoder may reduce each feature of the input data set.

It will be appreciated that the reduced data set defines data to be used as an input to the layer when the trained neural network is utilized.

It will be appreciated that the method as described in FIG. 2 may be applied in between any or all of the layers of the neural network. The application of the method in between any layers may therefore affect the amount of data that is being sent in between those layers and, in some examples, the amount of data transmitted between following layers in the neural network.

Finally, method of FIG. 2 may be further enhanced if implemented in special hardware where the network interface controller (NIC) is directly linked to the memory of the processing unit of the neural network, thereby eliminating the need for a CPU to copy any data, and instead allowing the CPU to perform instructions directly once the information from the NIC is received.

Figure 3:
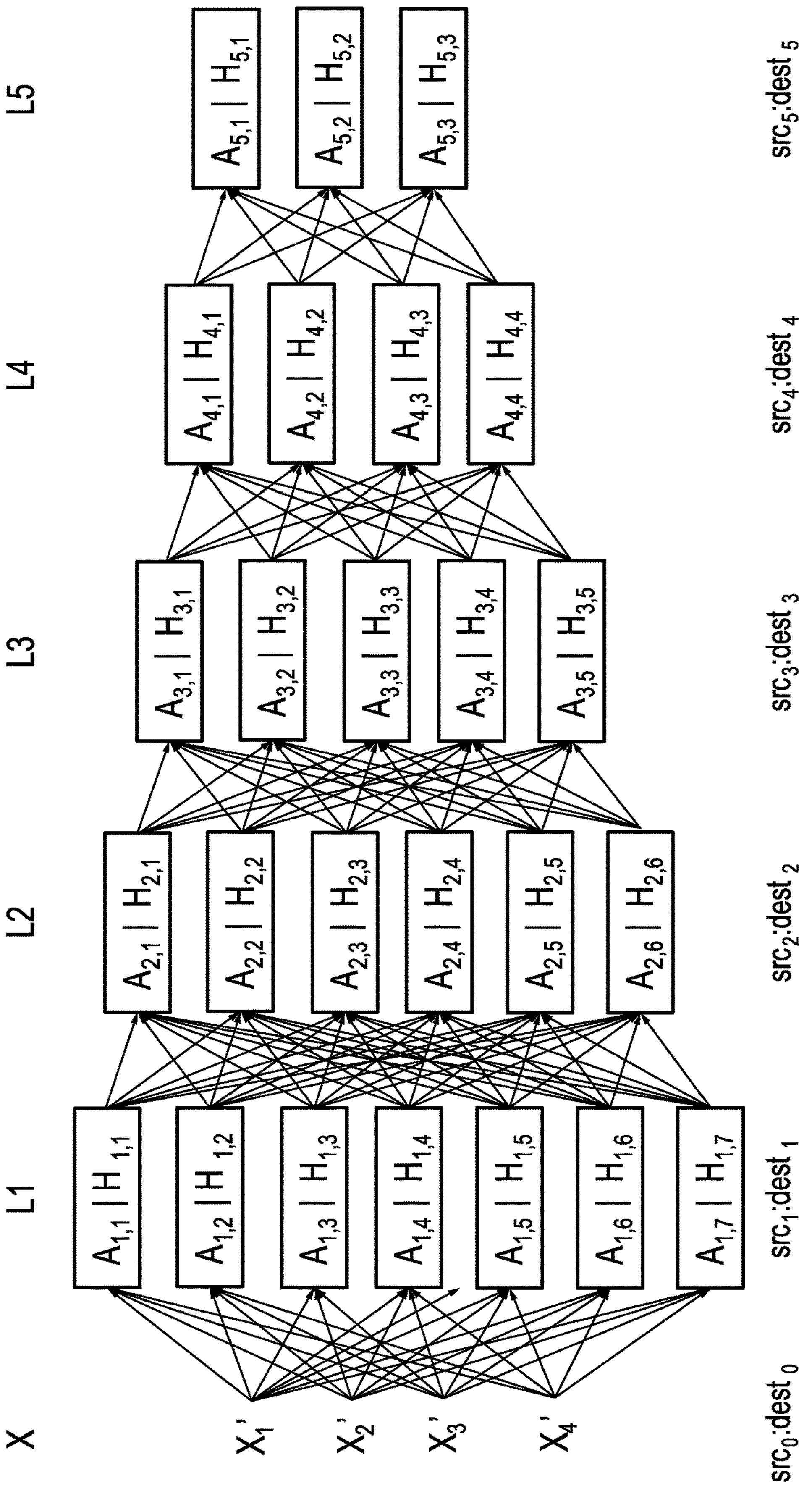
FIG. 3 illustrates an example of a reduced data set for the neural graph illustrated in FIG. 1 once the method of FIG. 2 is applied.

FIG. 3 illustrates an example of a reduced data set for the neural graph 100 illustrated in FIG. 1 once the method of FIG. 2 is applied.

In this example, the input data set of vector X has been reduced. In particular, PCA has been performed and it is determined that the features $x_1$ to $x_4$ are the principle components of the vector. In this example therefore the reduced input data set comprises the features $x_1$ to $x_4$. It will be appreciated that only the features $x_1$ to $x_4$ will then be used as input data for the trained neural network when the trained neural network is in use, rather than features $x_1$ to $x_7$. It will be appreciated that the features provided as the reduced data set may be a result of a transformation produced by, for example, PCA or via the use of autoencoder.

Figure 4:
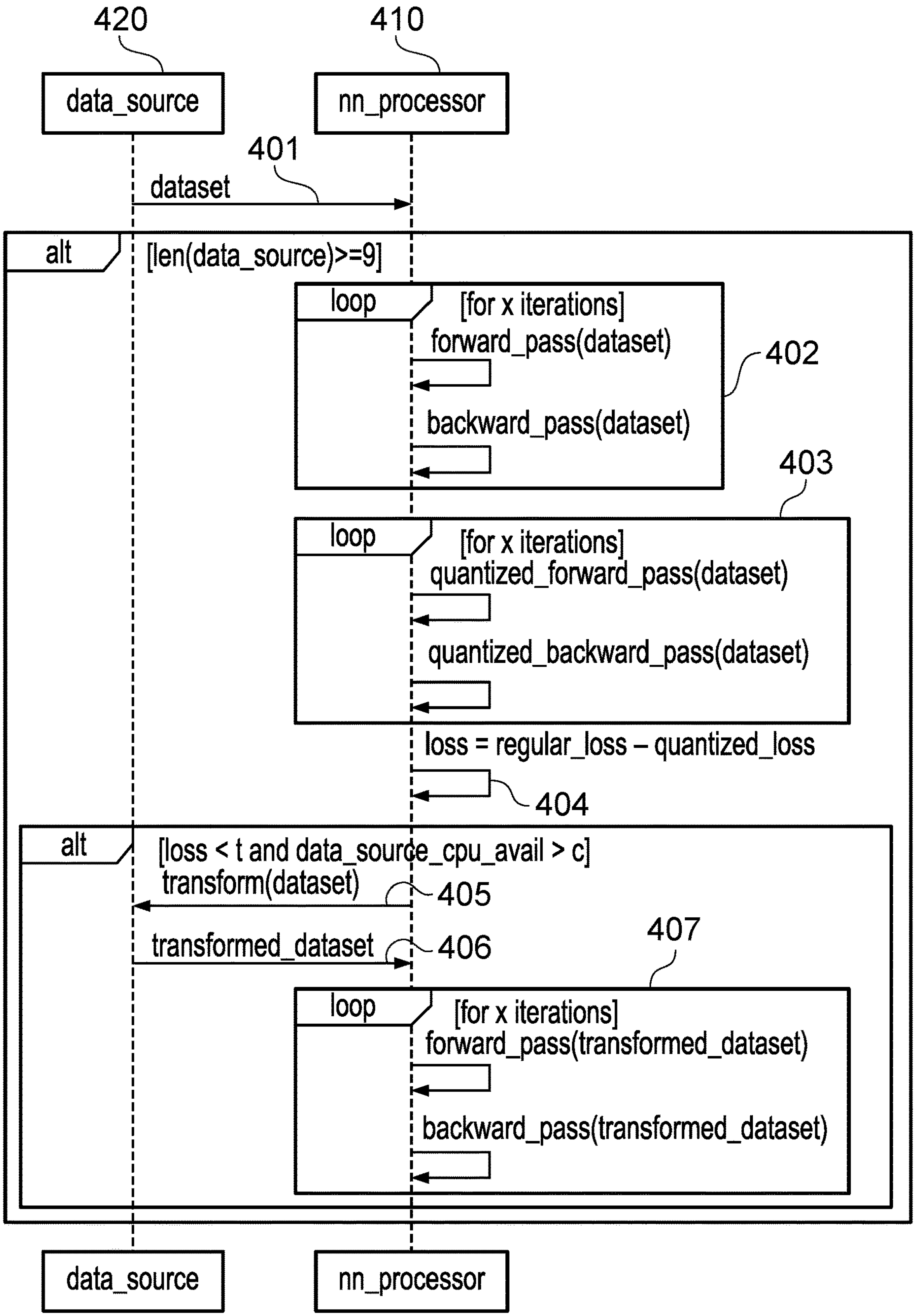
FIG. 4 illustrates a signaling diagram illustrating an example implementation of the method of FIG. 2.

FIG. 4 illustrates a signaling diagram illustrating an example implementation of the method of FIG. 2. In this example, the processor nn_processor 410 comprises a network node that holds all layers of the neural network. It will however be appreciated that different processors (or different network nodes) may implement different layers of the neural network.

In this example, a source of the input training data comprises the source node data_source 420 (as described in the network-aware neural graph). The input data set in this example comprises a vector of length x.

In step 401, the nn_processor 410 receives the input data set from data_source 420. In some examples, the input data set comprises an address of the data_source 420.

In this example, the steps 402 onwards are performed in response to the length of the vector x (or the size of the input data set) being greater than a threshold value. In this example the threshold value is 9.

In step 402, similarly to as described in step 204, the nn_processor 410 performs a forward pass and a backward pass on the input data set to determine regular output data.

In step 403, similarly to as described in step 202, the nn_processor 410 performs a quantized forward pass and a quantized backward pass on the input data set to determine quantized output data.

It will be appreciated that the order of steps 402 and 403 is arbitrary, and that, in some examples, they may be performed in parallel.

In step 404, the nn_processor 410 compares a first loss, regular_loss, associated with the regular output data to a second a second loss, quantized_loss, associated with the quantized output data, In this example, the nn_processor compares the first loss and the second loss by determining a magnitude, loss, of the difference between regular_loss and quantized_loss.

The nn_processor 410 then determines whether the magnitude of the difference between the first loss and the second loss is less than a threshold value t. The threshold value t may be a small decimal number, for example 0.05.

Responsive to the magnitude of the difference between the first loss and the second loss is less than a threshold value t, the nn_processor 410 may perform step 405. In some examples, step 405 may only be performed if the CPU processing power available at the source of the input data set is greater than a predetermined threshold c.

In step 405, the nn_processor 410 transmits a request to the data_source 420 to transform the input data set into a reduced data set. As in step 401 the input data set comprises an indication of the address of the data_source, the nn_processor may be able to transmit the request in step 405 based on the address received in step 401.

In step 406, the data_source 420 returns a reduced data set to the nn_processor 410. The transformation of the input data set into the reduced data set may be performed by the data_source 420, or may be performed by another processor. As previously mentioned, the reduced data set may, for example be produced using PCA or an autoencoder.

If the data_source 420, for example, did not have capacity to perform the transformation of the input data set, the transformation may be performed by another network node. In this example, the nn_processor 410 may receive the reduced data set in step 406 from the network node that performed the transformation.

In step 407, the nn_processor 410 performs a forward pass and a backward pass on the reduced data set to determine regular output data based on the reduced data set. As the method as described with reference to FIG. 2 has already been performed at this stage, there may be no need to perform the method again as the input data set has already been reduced.

It will also be appreciated that in examples in which it is determined not to reduce the input data set, it may be beneficial to quantize the input data set for further passes in the iterations of training the neural network.

Figure 5:
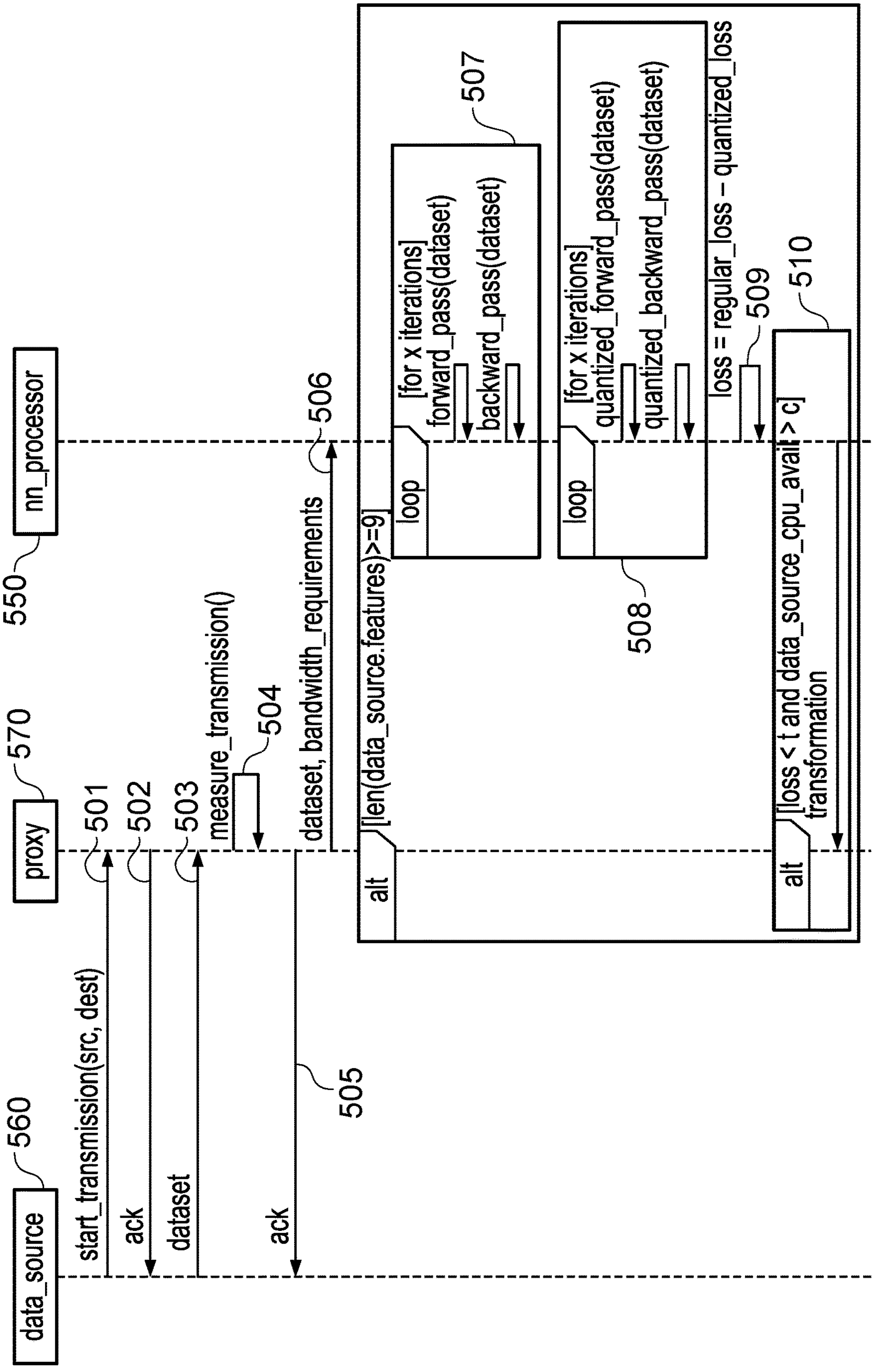
FIG. 5 illustrates a signaling diagram illustrating an example implementation of the method of FIG. 2.
Figure 5:
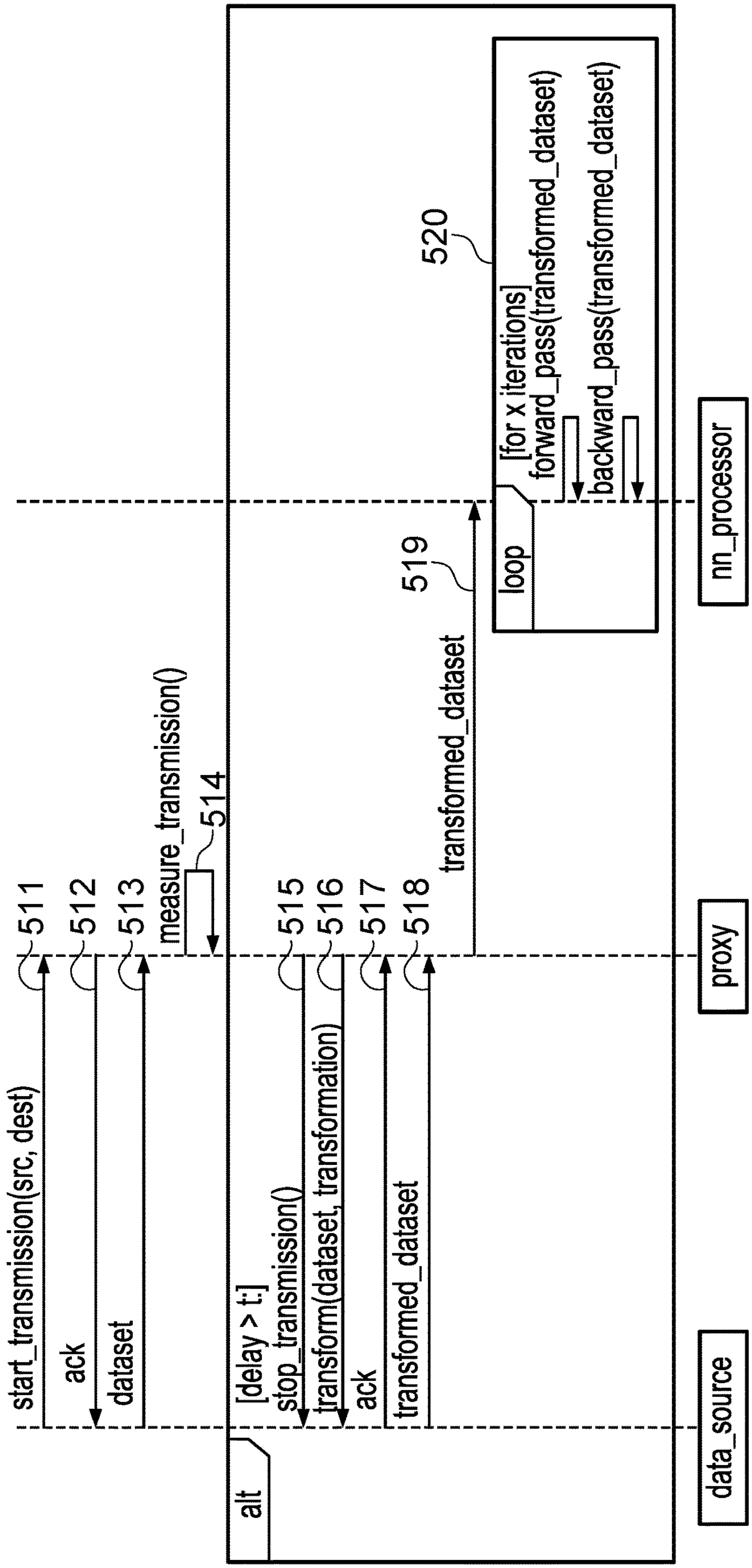

FIG. 5 illustrates a signaling diagram illustrating an example implementation of the method of FIG. 2. Similarly to as in FIG. 4, the processor nn_processor 550 comprises a network node that holds all layers of the neural network. It will however be appreciated that different processors (or different network nodes) may implement different layers of the neural network.

In this example, a source of the input training data comprises the network node data_source 560 (as described in the network-aware neural graph). The input data set in this example comprises a vector of length x.

In this example, however, a proxy network node 570, for example a neural network orchestrator is configured to control the layers of the neural network.

In step 501, the proxy network node 570 receives a request from the data_source 560 to start transmissions. The request may comprise an indication of the address of the data_source 560. The request may further comprise an indication of the address of the proposed destination for the transmissions, e.g. the nn_processor 550.

In step 502, the proxy network node 570 acknowledges the request received in step 501.

In step 503, the data_source 560 transmits the input data set to the proxy network node 570.

In this example, in step 504, the proxy network node 570 measures how much time it takes for the input data set to be transmitted to the proxy network node, thus assessing link capabilities. This measurement may be used to determine latency and throughput of the link between the data_source 560 and the proxy network node 570.

In step 505, the proxy network node 570 acknowledges the receipt of the input data set.

In step 506, the proxy network node 570 transmits the input data set to the nn_processor 550. The address of the nn_processor may be as received in step 501. In some examples, the proxy node includes an indication of bandwidth requirements of the link between the data_source and the proxy node. The nn_processor may then determine whether or not to perform steps 507 to 510. For example, the input data set may not need to be reduced if there is plenty of bandwidth available.

In this example, the steps 507 onwards are performed in response to the length of the vector x (or the size of the input data set) being greater than a threshold value. In this example the threshold value is 9, but it will be appreciated that any suitable value may be used.

In step 507, similarly to as described in step 202, the nn_processor 550 performs a forward pass and a backward pass on the input data set to determine regular output data.

In step 508, similarly to as described in step 204, the nn_processor 550 performs a quantized forward pass and a quantized backward pass on the input data set to determine quantized output data.

In step 509, the nn_processor 550 compares a first loss, i.e. regular_loss, associated with the regular output data to a second a second loss, i.e. quantized_loss, associated with the quantized output data, In this example, the nn_processor compares the first loss and the second loss by determining a magnitude, loss, of the difference between regular_loss and quantized_loss.

The nn_processor 550 then determines whether the magnitude of the difference between the first loss and the second loss is less than a threshold value t. The threshold value t may be a small decimal number, for example 0.05.

Responsive to the magnitude of the difference between the first loss and the second loss is less than a threshold value t, the nn_processor 550 may perform step 510.

In step 510, the nn_processor 550 transmits a request to the proxy network 570 to request transformation of the input data set into a reduced data set. In other words, responsive to determining to reduce the input data set, the nn_processor transmits a request to the proxy network node 570 to reduce the input data set.

The proxy network node 570 may then wait until the data_source 560 requests again to start transmissions to the nn_processor 550, as in step 511.

In step 512, the proxy network node 570 acknowledges the request of step 511.

In step 513, the data_source 560 transmits an input data set to the proxy network node 570. This input data set may comprise different information to the input data set of step 503. For example, the training process may now be utilizing different training data to train the model. For example, a different input data set that has a known ground truth output.

In some examples, in step 514, the proxy network node 570 repeats the measurement made in step 504. This repeat measurement may be used to check if the latency and throughput of the link between the data_source 560 and the proxy network node 570 has improved.

In this example, the input data set received in step 513 has not been transformed.

In this example, there is a latency in the network and a delay has exceeded a threshold. In this example, this latency triggers the performance of the steps 515 to 520. The proxy network node 570 transmits a request in step 515 to instruct the data_source to stop transmission of the input data set.

In step 516, the proxy network node 570 transmits a request to the data_source 560 to transform the input data set into a reduced data set. As in step 501 the data_source indicates the address of the data_source, the proxy network node 570 may be able to transmit the request in step 516 based on the address received in step 501.

In step 517, the data_source 560 acknowledges the request received in step 516.

In step 518, the data_source 560 returns a reduced data set to the proxy network node 570.

In step 519, the proxy network node 570 forwards the reduced data set to the nn_processor 550.

In step 520, the nn_processor 550 performs a forward pass and a backward pass on the reduced data set to determine regular output data based on the reduced data set. As the method as described with reference to FIG. 2 has already been performed at this stage, there may be no need to perform the method again as the input data set has already been reduced.

It will also be appreciated that in examples in which it is determined not to reduce the input data set, it may be beneficial to quantize the input data set for further passes in the iterations of training the neural network.

The neural network that is trained according to the method as described above with reference to any of FIGS. 2 to 5 may then be utilized. In examples in which the training of the neural network comprises determining to reduce the input data set, then use of the neural network comprises inputting input data to the layer corresponding to the reduced data set. It will also be appreciated that use of the neural network, then comprises generating output parameters from the layer based on the input data that corresponds to the reduced data set.

In some examples, the output parameters generated as output on use of the neural network are provided as input into a next layer in the neural network. In some examples, the output parameters generated as output on use of the neural network are the output data from the neural network.

Figure 6:
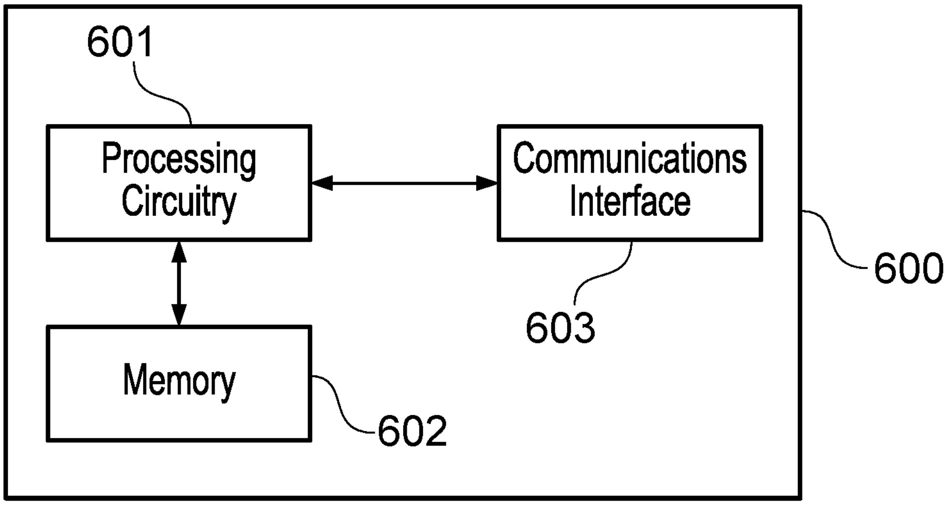
FIG. 6 illustrates a network node comprising processing circuitry (or logic).

FIG. 6 illustrates a network node 600 comprising processing circuitry (or logic) 601. The processing circuitry 601 controls the operation of the network node 600 and can implement the method described herein in relation to a network node 600. The processing circuitry 601 can comprise one or more processors, processing units, multi-core processors or modules that are configured or programmed to control the network node 600 in the manner described herein. In particular implementations, the processing circuitry 601 can comprise a plurality of software and/or hardware modules that are each configured to perform, or are for performing, individual or multiple steps of the method described herein in relation to the network node 600.

Briefly, the processing circuitry 601 of the network node 600 is configured to: receive an input data set at a layer of the neural network; perform a forward pass and a backward pass on the input data set to determine regular output data; calculate a first loss associated with the regular output data; perform a quantized forward pass and a quantized backward pass on the input data set to determine quantized output data; calculate a second loss associated with the quantized output data; compare the first loss to the second loss; and based on the comparison, determine whether to reduce the input data set to provide a reduced data set.

In some embodiments, the network node 600 may optionally comprise a communications interface 602. The communications interface 602 of the network node 600 can be for use in communicating with other nodes, such as other virtual nodes. For example, the communications interface 602 of the network node 600 can be configured to transmit to and/or receive from other nodes requests, resources, information, data, signals, or similar. The processing circuitry 601 of network node 600 may be configured to control the communications interface 602 of the network node 600 to transmit to and/or receive from other nodes requests, resources, information, data, signals, or similar.

Optionally, the network node 600 may comprise a memory 603. In some embodiments, the memory 603 of the network node 600 can be configured to store program code that can be executed by the processing circuitry 601 of the network node 600 to perform the method described herein in relation to the network node 600. Alternatively or in addition, the memory 603 of the network node 600, can be configured to store any requests, resources, information, data, signals, or similar that are described herein. The processing circuitry 601 of the network node 600 may be configured to control the memory 603 of the network node 600 to store any requests, resources, information, data, signals, or similar that are described herein.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

Embodiments described herein therefore provide methods and apparatuses for determining if it is possible to reduce the amount of data moving from one region of neural network to another (including data source) by way of quantization. In some examples, the input data set may be provided with a physical address that shows the origin of input data set.

The invention claimed is:

1. A method of training a neural network, the method comprising:

receiving an input data set at a layer of the neural network;

performing a forward pass and a backward pass on the input data set to determine regular output data;

calculating a first loss associated with the regular output data;

performing a quantized forward pass and a quantized backward pass on the input data set to determine quantized output data, wherein the quantized forward pass and the quantized backward pass comprise providing a quantized version of each parameter in each layer of the neural network;

calculating a second loss associated with the quantized output data;

comparing the first loss to the second loss, wherein said comparing comprises determining a magnitude of a difference between the first loss and the second loss; and based on the comparison, determining whether to reduce the input data set to provide a reduced data set, wherein determining whether to reduce the input data set comprises determining to reduce the input data set based on the magnitude of the difference between the first loss and the second loss being below a threshold value or zero.

2. The method of claim 1 further comprising, responsive to determining to reduce the input data set, performing a transformation of the input data set to determine principle components of the input data set, and setting the principle components of the input data set as the reduced data set.

3. The method as claimed in claim 2 wherein performing the transformation comprises performing principle component analysis (PCA) on the input data set.

4. The method as claimed in claim 1 further comprising, responsive to determining to reduce the input data set, utilizing an autoencoder to determine the reduced data set.

5. The method as claimed in claim 1 wherein calculating the first loss associated with the regular output data comprises calculating a first mean square error associated with the regular output data, and wherein calculating the second loss associated with the quantized output data comprises calculating a second mean square error associated with the quantized output data.

6. The method of claim 1 wherein the reduced data set defines data to be used as an input to the layer when the trained neural network is utilized.

7. The method of claim 1 wherein the input data set comprises training data provided as input to the neural network or neural network parameters received from a previous layer in the neural network.

8. A system comprising a neural network where the neural network is trained by:

receiving an input data set at a layer of the neural network;

performing a forward pass and a backward pass on the input data set to determine regular output data, wherein the quantized forward pass and the quantized backward pass comprise providing a quantized version of each parameter in each layer of the neural network;

calculating a first loss associated with the regular output data;

performing a quantized forward pass and a quantized backward pass on the input data set to determine quantized output data;

calculating a second loss associated with the quantized output data;

comparing the first loss to the second loss, wherein said comparing comprises determining a magnitude of a difference between the first loss and the second loss; and based on the comparison, determining whether to reduce the input data set to provide a reduced data set, wherein determining whether to reduce the input data set comprises determining to reduce the input data set based on the magnitude of the difference between the first loss and the second loss being below a threshold value or zero.

9. A network node for implementing training of a neural network, the network node comprising processing circuitry configured to:

receive an input data set at a layer of the neural network;

perform a forward pass and a backward pass on the input data set to determine regular output data, wherein the quantized forward pass and the quantized backward pass comprise providing a quantized version of each parameter in each layer of the neural network;

calculate a first loss associated with the regular output data;

perform a quantized forward pass and a quantized backward pass on the input data set to determine quantized output data;

calculate a second loss associated with the quantized output data;

compare the first loss to the second loss, by determining a magnitude of a difference between the first loss and the second loss; and based on the comparison, determine whether to reduce the input data set to provide a reduced data set, wherein the processing circuitry is configured to determine to reduce the input data set based on the magnitude of the difference between the first loss and the second loss being below a threshold value or zero.

10. The network node of claim 9 wherein the processing circuitry is configured to determine to reduce the input data set responsive to the magnitude of the difference between the first loss and the second loss being below the threshold value.

11. The network node of claim 9 wherein the processing circuitry is configured to determine to reduce the input data set responsive to the magnitude of the difference between the first loss and the second loss being zero.

12. The network node of claim 9 wherein the processing circuitry is further configured to, responsive to determining to reduce the input data set, perform a transformation of the input data set to determine principle components of the input data set, and set the principle components of the input data set as the reduced data set.

13. The network node as claimed in claim 12 wherein the processing circuitry is configured to perform the transformation by performing principle component analysis (PCA) on the input data set.

14. The network node as claimed in claim 9 wherein the processing circuitry is further configured to, responsive to determining to reduce the input data set, utilize an autoencoder to determine the reduced data set.

15. The network node as claimed in claim 9 wherein the processing circuitry is configured to calculate the first loss associated with the regular output data by calculating a first mean square error associated with the regular output data; and to calculate the second loss associated with the quantized output data by calculating a second mean square error associated with the quantized output data.

16. The network node of claim 9 wherein the reduced data set defines data to be used as an input to the layer when the trained neural network is utilized.

17. The network node of claim 9 wherein the input data set comprises training data provided as input to the neural network or neural network parameters received from a previous layer in the neural network.

* * * * *